United States Patent
Collins et al.

[11] Patent Number: 5,411,292
[45] Date of Patent: May 2, 1995

[54] SEAT BELT SYSTEM WITH LOCKING GUIDE LOOP ASSEMBLY

[75] Inventors: Cecil A. Collins, Shelby Township, Macomb County; Dagoberto Krambeck, Troy; Steven J. Richter, St. Clair Shores, all of Mich.

[73] Assignee: AlliedSignal, Inc., Morristown, N.J.

[21] Appl. No.: 228,556

[22] Filed: Apr. 15, 1994

[51] Int. Cl.⁶ .............................................. B60R 22/36
[52] U.S. Cl. ..................................... 280/806; 280/808; 297/476; 297/479
[58] Field of Search ....................... 280/806, 808, 801; 297/483, 486, 476, 479, 480

[56] References Cited

U.S. PATENT DOCUMENTS

| | | | |
|---|---|---|---|
| 4,208,770 | 6/1980 | Takada | 297/476 |
| 4,398,680 | 8/1983 | Ogawa et al. | 297/480 |
| 4,494,774 | 1/1985 | Fohl | 280/806 |
| 4,756,554 | 11/1988 | Tibbe | 280/806 |
| 4,786,079 | 11/1988 | Wyder et al. | 280/806 X |
| 5,160,167 | 11/1992 | Fourrey et al. | 280/806 |
| 5,316,359 | 5/1994 | Lorenz | 297/480 X |

FOREIGN PATENT DOCUMENTS 0013221 2/1977 Japan ................................. 280/808

*Primary Examiner*—Margaret A. Focarino
*Assistant Examiner*—Christopher P. Ellis
*Attorney, Agent, or Firm*—Harness, Dickey & Pierce

[57] ABSTRACT

A safety belt restraint system is disclosed which greatly reduces the loading exerted by the shoulder belt on both the seat belt retractor and the shoulder belt guide loop. In this regard, an improved guide loop assembly is mounted to the support pillar and includes a unique belt clamping mechanism that is operable in a first mode to permit movement of the belt webbing through a guideway during normal vehicle operating conditions, and in a second mode to clamp the belt webbing for restricting movement thereof through the guideway during a collision or a hard braking situation. The guide loop assembly of the present invention is preferably applicable for use in safety belt restraint systems of the type equipped with an emergency locking mechanism. Thus, the belt clamping mechanism is integrated into the guide loop assembly and is automatically actuated to inhibit movement of the shoulder belt webbing through the guideway in response to actuation of the emergency locking mechanism associated with the seat belt retractor.

11 Claims, 3 Drawing Sheets

SEAT BELT SYSTEM WITH LOCKING GUIDE LOOP ASSEMBLY

FIELD OF THE INVENTION

The present invention relates generally to safety belt restraint systems for motor vehicles and, more particularly, to the incorporation of a belt clamping mechanism into a shoulder belt guide loop assembly of an automobile seat belt system.

BACKGROUND OF THE INVENTION

As is known, motor vehicles are equipped with safety belt restraint systems that are operable to physically restrain both forward and lateral motion of a seat occupant during a collision. Such safety belt restraint systems typically include a lap belt and a shoulder belt which, in most modern vehicles, are combined into a single seat belt. In such safety belt systems, one end of the seat belt is typically anchored to the frame of the motor vehicle at a location near the floor pan while the opposite end of the seat belt is coupled to a seat belt retractor that is mounted to the vehicle frame at the base of a support pillar (i.e., B-pillar). It is also common to mount a guide ring near the top of the support pillar so that the belt emanating from the seat belt retractor is initially routed upward along the pillar and looped over the guide ring to ensure that the shoulder belt is properly routed over the shoulder and upper torso of the seat occupant. In addition, a tongue plate is typically attached to the seat belt between the guide ring and the first anchor point for latched engagement with an anchored seat belt buckle.

Modernly, most safety belt restraint systems are of the emergency locking type and employ a locking mechanism which is operable to automatically shift the seat belt retractor from a "released" mode into a "locked" mode when the motor vehicle is subjected to deceleration forces exceeding a predetermined threshold level, thereby inhibiting subsequent withdrawal (i.e., "payout") of the belt webbing from the retractor. During normal vehicle operating conditions, however, the locking mechanism is adapted to maintain the seat belt retractor in its "released" mode such that the belt webbing may be controllably withdrawn therefrom. In some applications, the locking mechanism is an electrically-controlled solenoid actuator that is operable to shift the seat belt retractor into the "locked" mode in response to detection by a suitable sensor of an excessive vehicular deceleration condition. Alternatively, an inertia-sensitive locking mechanism may be integrated into the seat belt retractor. Such emergency locking retractors (ELR) are widely used in many conventional safety belt restraint systems since they provide improved comfort, convenience and freedom of movement for the seat occupants. An example of an emergency locking retractor equipped with a pendulum-type inertia-sensitive locking mechanism is disclosed in commonly owned U.S. Pat. No. 5,121,887 to Schmidt et al.

While conventional seat belt retractors equipped with such emergency locking mechanisms generally perform satisfactorily for their intended purpose, they must, however, be designed and built to accommodate extremely high and abrupt belt loading conditions. For instance, the tension loading exerted on the shoulder belt by the seat occupant during a collision or heavy braking condition is ultimately transferred to the guide ring and the seat belt retractor. As such, the structural load-bearing requirements for the guide ring and the seat belt retractor, as well as for the vehicular frame structure of the support pillar at the guide ring anchor site and at the retractor mounting site, must be capable of withstanding instances of such severe belt loading.

In an effort to minimize the belt loading that is ultimately transferred to the seat belt retractor, it has been proposed to incorporate a belt clamping mechanism into the safety belt restraint system for applying a clamping force on the belt webbing at a location upstream of the emergency locking mechanism. One example of such an arrangement is disclosed in U.S. Pat. No. 5,211,694 to Sakakida et al wherein the belt clamping mechanism is mounted to the retractor assembly. Alternatively, it has also been proposed to locate the belt clamping mechanism in close proximity to the guide ring. Examples of belt clamping mechanisms associated with a shoulder belt guide ring are disclosed in U.S. Pat. Nos. 4,494,774 to Fohl; 4,550,951 to Apri; 4,682,791 to Ernst; 4,747,617 to Magyar et al; 4,756,554 to Tibbe; 4,786,079 to Wyder; 4,993,746 to Hagelthorn; and 5,160,167 to Fourrey et al. While such auxiliary belt clamping mechanisms are designed to fulfill their intended purpose, most are relatively complex in structure and/or expensive to manufacture.

SUMMARY OF THE INVENTION

In view of the foregoing, the need exists to provide a safety belt restraint system which greatly reduces the loading exerted by the shoulder belt on both the seat belt retractor and the guide ring. In this regard, a guide loop assembly is provided which includes a unique belt clamping mechanism that is operable in a first mode to permit movement of the belt webbing through a guideway during normal vehicle operating conditions, and in a second mode to clamp the belt webbing for restricting movement thereof through the guideway during a collision or a hard braking situation.

The guide loop assembly of the present invention is preferably applicable for use in safety belt restraint systems of the type having the seat belt retractor equipped with an emergency locking mechanism. Thus, it is a primary object of the present invention to provide a belt clamping mechanism that is integrated into a guide loop assembly and which is automatically actuated to inhibit payout of the shoulder belt webbing through the guideway in response to actuation of the emergency locking mechanism.

It is yet another object of the present invention to incorporate a belt clamping mechanism into a guide loop assembly which is adapted to inhibit the transfer of belt loading to the seat belt retractor following actuation of the emergency locking mechanism. Thus, the load-carrying requirements of the seat belt retractor and its vehicular mounting site can be substantially reduced. Moreover, the belt clamping mechanism of the present invention is further operable to substantially reduce the belt loading transferred through the guide loop assembly to the support pillar.

It is still another object of the present invention to provide a guide loop assembly including a belt clamping mechanism which is relatively inexpensive to produce, easy to manufacture and which can be installed within most conventional motor vehicle safety belt restraint systems.

Other advantages and features will become apparent from the following specification taken in connection with the accompanying drawings.

DETAILED DESCRIPTION OF THE PREFERRED EMBODIMENT

Figure 1:
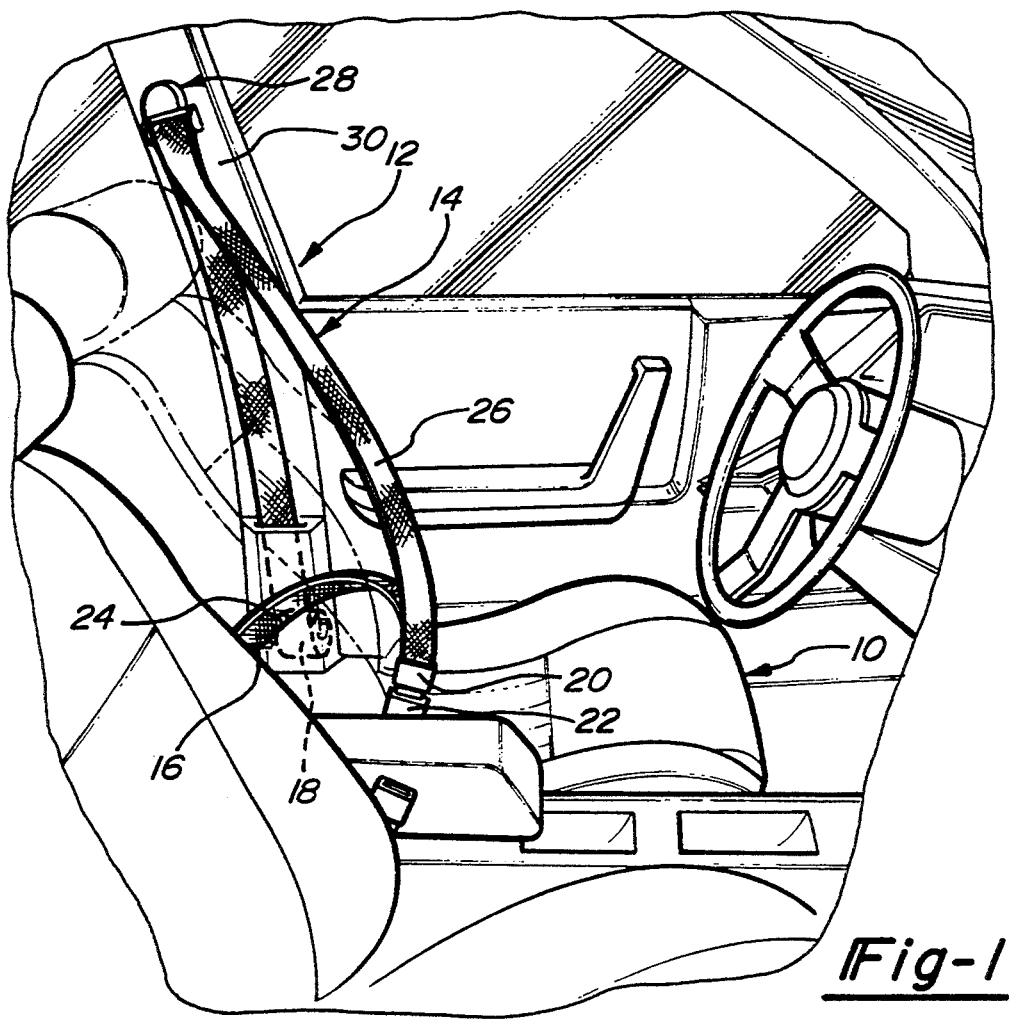
FIG. 1 is a partial perspective view of an exemplary motor vehicle passenger compartment showing a safety belt restraint system.
Figure 2:
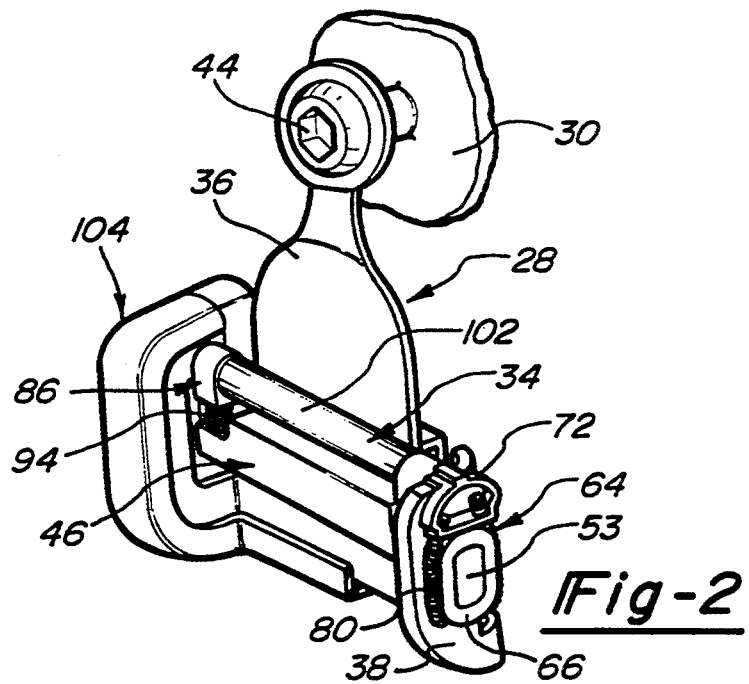
FIG. 2 is a perspective view of a guide loop assembly having a belt clamping mechanism according to a preferred embodiment of the present invention.
Figure 3:
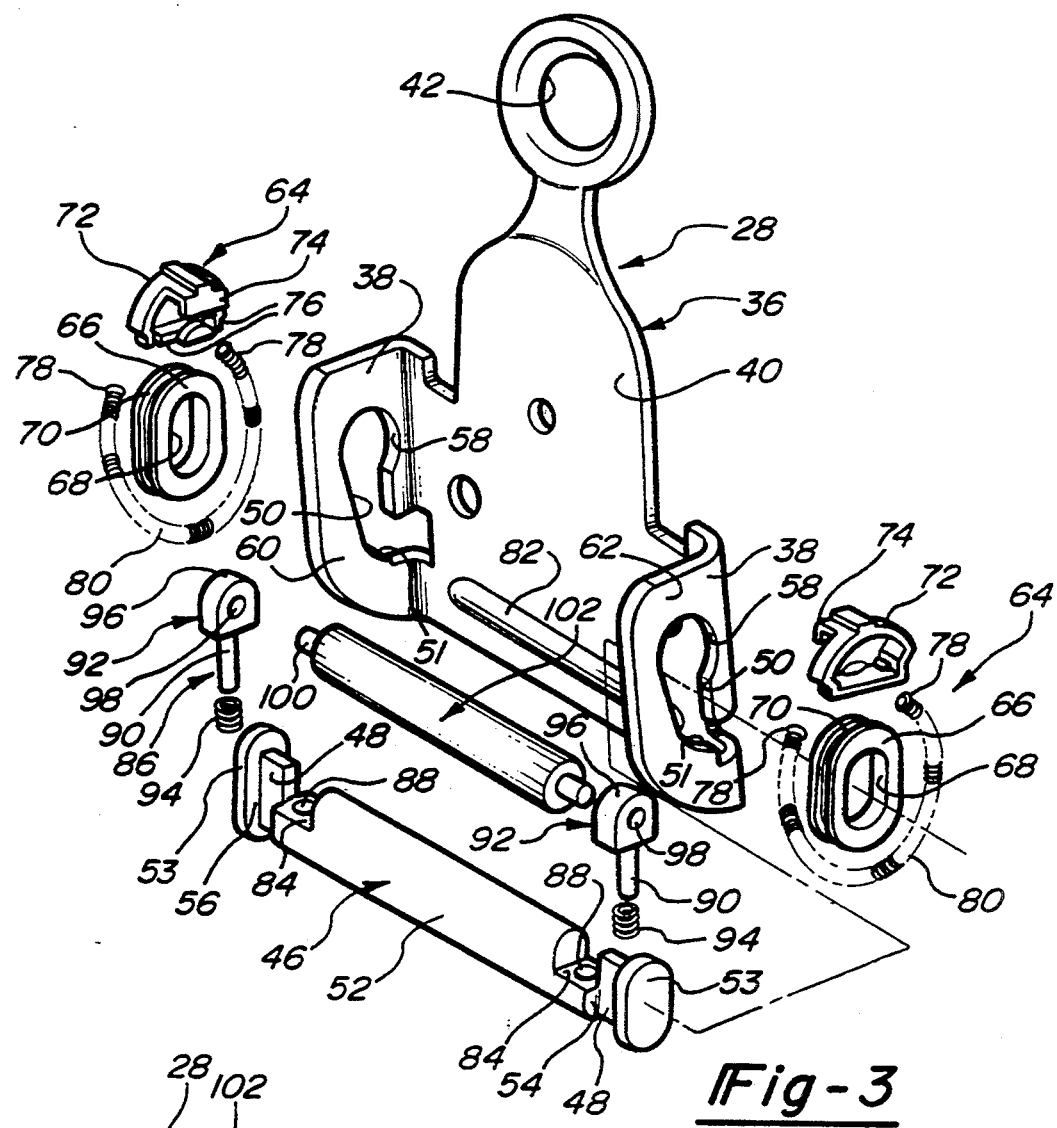
FIG. 3 is an exploded perspective view of the guide loop assembly shown in FIG. 2.

Referring to FIG. 1, a portion of the front passenger compartment of an exemplary motor vehicle is shown to include a front seat 10 and a safety belt restraint system 12. Safety belt restraint system 12 includes a safety belt 14 having a first end affixed to the vehicle's frame structure by an anchor mount 16 and a second end fixed to a seat belt retractor 18. A tongue plate 20 is retained on safety belt 14 for insertion into a seat belt buckle 22 that is rigidly anchored on the opposite side of seat 10. As such, the belt webbing between anchor mount 16 and tongue plate 20 collectively form a "lap belt" 24 of safety belt 14. Similarly, the belt webbing between tongue plate 20 and seat belt retractor 18 is referred to as a "shoulder belt" 26 of safety belt 14. Furthermore, shoulder belt 26 passes through a guide loop assembly 28 which is pivotably anchored to a support pillar, herein shown as B-pillar 30, of the automobile frame and is then routed downward along B-pillar 30 to seat belt retractor 18.

Seat belt retractor 18, which is shown mounted to the base of B-pillar 30, is of a conventional design for allowing shoulder belt 26 to be withdrawn and retracted as necessary. According to a preferred embodiment, seat belt retractor 18 is an emergency locking retractor having an inertia-sensitive locking mechanism which is operable to automatically inhibit withdrawal of shoulder belt 26 in response to detection of the vehicle being subjected to a deceleration rate above a predetermined threshold level. A spool-type belt retractor equipped with a pendulum-type inertia-sensitive locking mechanism is disclosed in commonly owned U.S. Pat. No. 5,121,887 to Schmidt et al and is an example of but one type of belt retractor that is clearly applicable for use in safety belt restraint system 10. Accordingly, the relevant portions of the above-noted Schmidt patent which pertain to the structure and function of the emergency locking retractor are expressly incorporated by reference herein. However, it is to be understood that any seat belt retractor having means for "locking-up" to prevent withdrawal of belt webbing following detection of a vehicular deceleration exceeding the threshold value is likewise within the scope of this invention. For example, a solenoid-actuated locking mechanism could be used in association with the seat belt retractor for inhibiting payout of belt webbing in response to detection of such a vehicular deceleration condition by a suitable sensor.

With particular reference to FIGS. 2 through 5, the structure and function of guide loop assembly 28 according to the present invention will now be described in greater detail. In general, guide loop assembly 28 is a "dual-function" device which defines a guideway 32 for inhibiting twisting of shoulder belt 26 during normal unrestricted movement thereof, and which also includes a unique belt clamping mechanism 34 for inhibiting movement of shoulder belt 26 through guideway 32 in response to lock-up of the inertia-sensitive locking mechanism in seat belt retractor 18. As will be described, a clamping force is exerted on shoulder belt 26 within guideway 32 by belt clamping mechanism 34 of a sufficient magnitude to inhibit further withdrawal of shoulder belt 26 through guide loop assembly 28. Thus, belt clamping mechanism 34 is operable to effectively limit the maximum belt loading exerted on seat belt retractor 18 to that nominally required to actuate its inertia-sensitive locking mechanism. This is highly desireable since the structural load-carrying requirement for seat belt retractor 18 and for its anchorage site at support pillar 30 can be substantially reduced.

Guide loop assembly 28 includes a frame 36 having a pair of side walls 38 extending laterally from a generally planar backing plate 40. Backing plate 40 includes an aperture 42 for receiving an anchor bolt 44 to pivotably secure guide loop assembly 28 to B-pillar 30 of the motor vehicle. Guide loop assembly 28 further includes a clamp bar 46 supported between the laterally extending side walls 38 of frame 36 for movement relative thereto. More particularly, rectangular tabs 48 are formed at opposite ends of clamp bar 46 and are retained within tapered slots 50 formed in side walls 38, and wherein each tapered slot 50 has a stop surface 51 associated therewith. Tabs 48 are inwardly recessed relative to the opposite lateral wall surfaces of an intermediate segment 52 and terminal end segments 53 of clamp bar 46, thereby defining shoulders 54 and 56, respectively. In addition, an enlarged aperture 58 is formed in each side wall 38 which communicates with the upper end of tapered slots 50. Apertures 58 are sized and aligned to permit end-wise insertion of end segments 53 therethrough such that each tab 48 can be aligned and retained within its tapered slot 50. As such, shoulders 54 are located contiguous to inner wall surfaces 60 of side walls 38 while shoulders 56 are located adjacent to outer wall surfaces 62 thereof such that tabs 48 are retained for generally vertical sliding movement within tapered slots 50.

Guide loop assembly 28 further includes means for normally biasing clamp bar 46 in an upward direction relative to frame 36. More particularly, a spring assembly 64 is coupled between each end segment 52 of clamp bar 46 and each side wall 38 of frame 36. Each spring assembly 64 includes an annular bushing 66 having an aperture 68 sized to receive and retain an end segment 53 of clamp bar 46 therein and a groove 70 formed in the outer peripheral surface thereof. Each spring assembly 64 also includes a spring retainer 72 disposed adjacent outer wall surface 62 of side wall 38 and which is affixed thereto by a clip segment 74 that is adapted to "snap-over" the upper edge segment of side wall 38. Moreover, each spring retainer 72 also includes a pair of sockets 76 adapted to receive and retain the ends 78 of an elongate helical coil spring 80 such that the "looped" intermediated portion of coil spring 80 is seated within groove 70 in annular bushing 66. Thus, spring assemblies 64 act on end segments 53 of clamp bar 46 to normally urge clamp bar 46 upwardly in a direction away from engagement with stop surfaces 51. Finally, an elongated protuberance or ridge 82 is formed to extend transversely from backing plate 40 which cooperates with intermediate segment 52 of clamp bar 46 to apply a frictional clamping force on shoulder belt 26 when clamp bar 46 is displaced within slots 50 in opposition to the biasing of spring assemblies 64, as will be hereafter described.

Clamp bar 46 is also formed to include a pair of channels 84 adjacent to tabs 48 and which include means for supporting a spring-loaded roller assembly 86 for movement relative to clamp bar 46. In particular, each channel 84 includes a bore 88 sized to journally receive an elongated pin segment 90 of a roller support 92. A helical coil spring 94 is assembled to coaxially surround pin 90 of each roller support 92 prior to insertion thereof into bore 88. More specifically, the under surface of an enlarged head portion 96 of roller support 92 and the lower planar surface of channel 84 act as spring retainers for coil spring 94. In addition, head portion 96 includes an aperture 98 sized for journally hosting a post segment 100 formed at each end of a cylindrical roller 102. With this arrangement, roller supports 92 are provided to support cylindrical roller 102 for rotation relative to clamp bar 46 and frame 36. Moreover, coil springs 94 act on roller supports 92 to normally bias cylindrical roller 102 in a direction away from clamp bar 46. Thus, roller assembly 86 is supported for spring-biased movement relative to clamp bar 46, such movement being independent of the relative movement between guide bar 46 and frame 36. Such an arrangement is provided to accommodate nominal belt loading exerted on shoulder belt 26 during otherwise normal movements of the seat occupant without actuating belt clamping mechanism 34.

Figure 4:
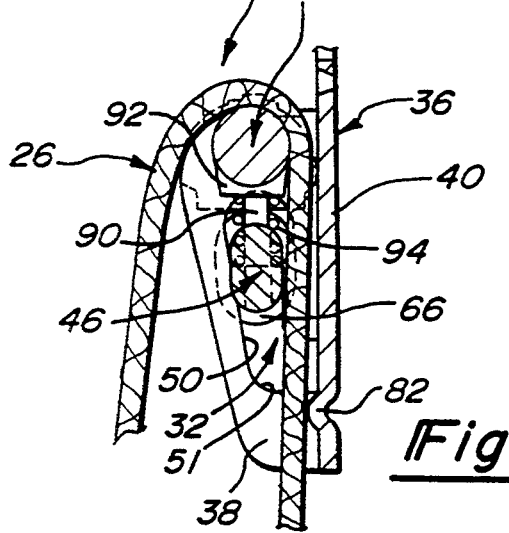
FIG. 4 is a partial sectional view of the guide loop assembly with the belt clamping mechanism in a "non-actuated" mode for permitting unrestricted movement of the safety belt webbing relative thereto.
Figure 5:
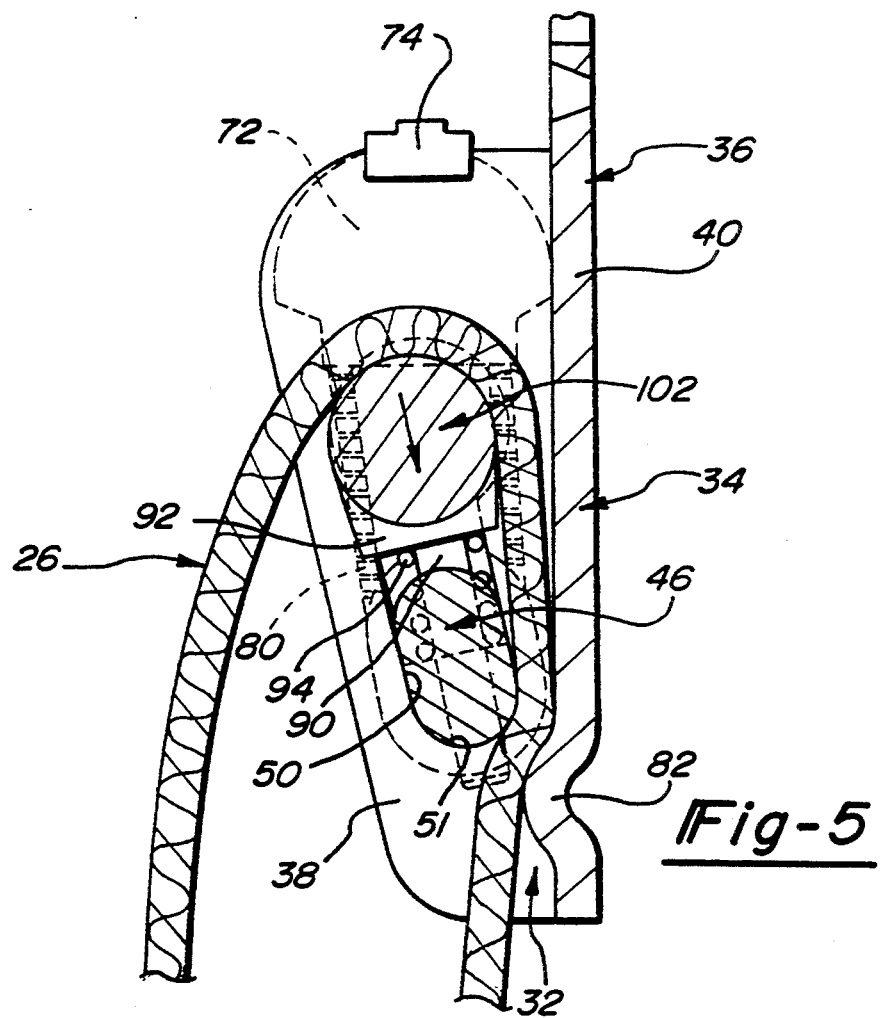
FIG. 5 is an enlarged partial sectional view, similar to FIG. 4, illustrating the belt clamping mechanism in an "actuated" mode for applying a clamping force to the safety belt webbing.

Once guide loop assembly 28 is assembled in the above discussed manner, shoulder belt 26 is routed through guideway 32 so as to pass between a rear edge of clamp bar 46 and a rear edge of cylindrical roller 102 and then is looped over the top of cylindrical roller 102 as shown most clearly in FIGS. 4 and 5. Thereafter, a cover assembly 104 is installed over frame 36 and various other guide loop components. Ideally, cover assembly 104 is made of a durable plastic material to surround and enclose portions of the exterior surfaces of backing plate 40 and side walls 38 as partially depicted in FIG. 2. The foregoing description describes the components of safety belt restraint system 10 and, in particular, guide loop assembly 28 according to the teachings of the present invention. A detailed discussion of the operational aspects of the invention will now be provided.

As best seen from FIG. 4, under normal conditions (i.e., when the motor vehicle is not being subjected to deceleration forces exceeding the threshold value), belt clamping mechanism 34 is maintained in a "non-actuated" mode. More particularly, the biasing of coil springs 94 acts to forcibly urge roller supports 92 away from clamp bar 46 for maintaining cylindrical roller 102 at a position displaced therefrom while spring assemblies 64 act to forcibly urge clamp bar 46 upwardly away from ridge 82 and stop surfaces 51. As such, intermediate segment 52 of clamp bar 46 is maintained in a position displaced from ridge 82 such that guideway 32 is "open" to allow for unrestricted sliding movement of the belt webbing therethrough. Under such conditions, cylindrical roller 102 essentially serves as a low friction pulley for assisting in directing the withdrawal and retraction of shoulder belt 26. Thus, when belt clamping mechanism 34 is in the "non-actuated" mode, the seat occupant is free to adjust shoulder belt 26 of safety belt 14 to any desired length merely by pulling out more webbing from seat belt retractor 18.

In contrast, under excessive deceleration conditions such as those which occur during heavy braking conditions or upon a vehicular impact, the inertia-sensitive locking mechanism in seat belt retractor 18 is shifted into its lock-up mode for inhibiting further payout of shoulder belt 26 therefrom. In response, clamping mechanism 34 is immediately and automatically actuated for applying a clamping force on the segment of shoulder belt 26 located within guideway 32 to prevent further movement of belt webbing therethrough. More specifically, immediately following such "emergency" lock-up of seat belt retractor 18, the continued forward movement of the seat occupant causes shoulder belt 26 to pull downwardly on cylindrical roller 102, thereby displacing roller supports 92 in opposition to the biasing of coil springs 94. As seen in FIG. 5, once the belt loading on cylindrical roller 102 exceeds the preload of coil springs 94, cylindrical roller 102 is forcibly displaced downwardly toward clamp bar 46. Simultaneously and upon continued application of increasing belt loading on shoulder belt 26, clamp bar 46 is driven downwardly within slots 50 in opposition to the biasing of spring assemblies 64. Such movement of clamp bar 46 causes a frictional clamping load to be applied to shoulder belt 26 between clamp bar 46 and locking ridge 82. Since belt clamping mechanism 34 is automatically actuated following lock-up of seat belt retractor 18 for clamping shoulder belt 26 within guideway 32 against further payout from guide loop assembly 28, seat belt retractor 18 need only be designed to accommodate the minimal belt loading required to overcome springs 80. This is significant since conventional seat belt retractors and their corresponding vehicular anchorage sites have heretobefore been required to accommodate the entire tension loading exerted on shoulder belt 26. Moreover, belt clamping mechanism 34 is also superior to conventional systems since the resultant or total loading exerted on B-pillar 30 via guide loop assembly 28 is significantly reduced.

Figure 6:
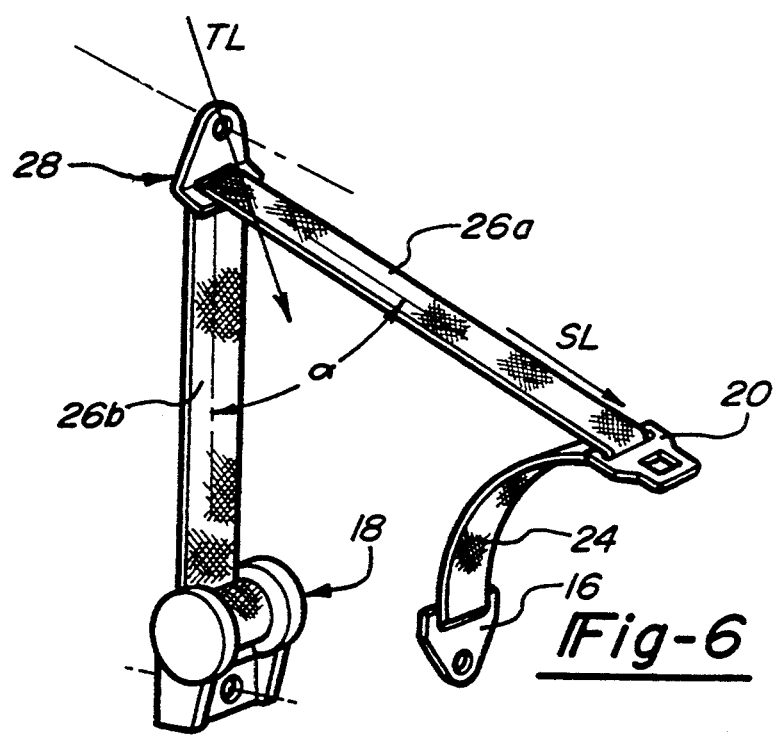
FIG. 6 is a pictorial view of the safety belt restraint system of the present invention for illustrating the load distribution exerted on the belt retractor and the guide loop assembly.

An example of the significant reduction in loading exerted on both retractor assembly 18 and B-pillar 30 is provided with reference to FIG. 6. As will appreciated, the tension loading applied to shoulder belt 26 by the seat occupant is the shoulder load (SL) directed along shoulder belt 26 which is directly transferred to retractor 18. Moreover, the resultant or total load (TL) applied to B-pillar 30 through guide loop assembly 28 is equal to the resultant load from both of first and second webbing segments 26a and 26b, respectively, of shoulder belt 26. Thus, the total load (TL) is the load component reacting along a vector bisecting the included angle ($\alpha$) between the first and second webbing segments 26 and 26b, respectively, as given by the following equation:

$$TL = \cos(\alpha) \times SL$$

If, for example, the included angle (α) is 80° and the shoulder load (SL) is a 3000 pound force, then retractor assembly 18 would have to accommodate the entire 3000 pound force shoulder load (SL) while the total load (TL) transferred to B-pillar 30 would be equal to a 4596 pound force. However, when guide loop assembly 28 of the present invention is used in safety belt system 10, upon actuation of belt clamping mechanism 34, the total load (TL) on the locked guide loop assembly 28 is only equal to the shoulder load (SL) reacted along second segment 26b of shoulder belt 26. Thus, if the shoulder load is a 3000 pound force then the total load (TL) on guide loop assembly 32 would also be 3000 pounds. More significant is the fact that following actuation of belt clamping mechanism 34, only a very small force is still exerted on retractor assembly 18 and not the full shoulder load. As noted, this small force is only of a magnitude required to overcome springs 80 for actuating belt clamping mechanisms 34 and would be in an exemplary range of 5 to 20 pounds force.

As can be seen by the preceding example, a significant reduction in the total loading exerted on the anchored components of safety belt system 10 can be accomplished during excessive deceleration conditions by providing guide loop assembly 28 of the present invention. While the above description constitutes the preferred embodiment of the present invention, it will be appreciated that the invention is susceptible to modifications, variations and change without departing from the proper scope and fair meaning of the claims.

What is claimed is:

1. A guide loop assembly anchored to a support pillar of a motor vehicle for guiding the seat belt webbing from a belt retractor, said guide loop assembly comprising:
    a frame anchored to the support pillar;
    a clamp bar supported from said frame for movement between a first position and a second position;
    first biasing means for normally biasing said clamp bar toward said first position;
    a belt-carrying roller rotatably supported from said clamp bar for rotational movement relative thereto; and
    second biasing means for normally biasing said roller away from said clamp bar and for maintaining a predetermined clearance between said clamp bar and said roller, whereby said roller may freely rotate with the belt webbing as it passes thereover;
    wherein the belt webbing is routed between said clamp bar and said frame and then over said roller such that under excessive vehicle deceleration conditions the belt webbing forcibly urges said clamp bar toward said second position for frictionally clamping the belt webbing against said frame.

2. The guide loop assembly of claim 1 wherein said frame includes a back segment and a pair of side segments extending transversely thereto, said side segments each having an elongated slot formed therein with opposite ends of said clamp bar retained with said slots.

3. The guide loop assembly of claim 2 wherein said elongated slots include stop surface means for locating said clamp bar in said second position, whereby movement of said roller toward said clamp bar results in movement of said clamp bar toward said second position in opposition to the biasing exerted thereon by said first biasing means for exerting a frictional clamping load on the belt webbing.

4. The guide loop assembly of claim 3 wherein said back segment of said frame has an outwardly extending ridge formed thereon which cooperates with said clamp bar to clamp the belt webbing therebetween under excessive vehicle deceleration conditions.

5. A guide loop assembly anchored to a support pillar of a motor vehicle for guiding the seat belt webbing from a belt retractor, said guide loop assembly comprising:
    a frame anchored to the support pillar;
    a clamp bar supported from said frame for movement between a first position and a second position;
    first biasing means for normally biasing said clamp bar toward said first position;
    a roller supported from said clamp bar for movement relative thereto;
    second biasing means for normally biasing said roller away from said clamp bar;
    said frame including a back segment and a pair of side segments extending transversely thereto, said side segments each having an elongated slot formed therein with opposite ends of said clamp bar retained with said slots; and
    said first biasing means including a pair of spring assemblies acting on opposite ends of said clamp bar, each of said spring assemblies comprising a spring retainer clip mounted to said side segment of said frame, a spring attached to said retaining clip, and a bushing having an aperture formed therethrough into which an end of said clamp bar extends, said bushing including a groove formed transversely about its periphery for receiving said spring;
    wherein the belt webbing is routed between said clamp bar and said frame and then over said roller such that under excessive vehicle deceleration conditions the belt webbing forcibly urges said clamp bar toward said second position for frictionally clamping the belt webbing against said frame.

6. The guide loop assembly of claim 1 wherein the belt retractor is of an emergency locking type having a locking mechanism operable to inhibit withdrawal of the seat belt webbing therefrom in response to detection of an excessive vehicular deceleration condition, and wherein such lock-up of said emergency locking retractor causes the loading exerted on the seat belt webbing to displace both of said clamp bar and said roller in opposition to the biasing of their respective biasing means for exerting a clamping force on the belt webbing of a sufficient magnitude to inhibit the transfer of further loading to the retractor.

7. The guide loop assembly of claim 1 wherein the support pillar is a B-pillar of the motor vehicle and said guide loop assembly is mounted thereto for routing a shoulder belt portion of the seat belt webbing over the shoulder of a front seat occupant.

8. A guide loop assembly anchored to a support pillar of a motor vehicle for guiding the seat belt webbing from a belt retractor, said guide loop assembly comprising:
    a frame anchored to the support pillar;
    a clamp bar supported from said frame for movement between a first position and a second position;
    first biasing means for normally biasing said clamp bar toward said first position;

a roller supported from said clamp bar for movement relative thereto;

second biasing means for normally biasing said roller away from said clamp bar; and a pair of roller support members between which said roller is retained, said roller support members having a pin segment journally retained within an aperture formed in said clamp bar such that said second biasing means acts between said clamp bar and said support members for normally maintaining a predetermined clearance between said clamp bar and said roller;

wherein the belt webbing is routed between said clamp bar and said frame and then over said roller such that under excessive vehicle deceleration conditions the belt webbing forcibly urges said clamp bar toward said second position for frictionally clamping the belt webbing against said frame.

9. The guide loop assembly of claim 8 wherein said roller support members each further include an enlarged head segment having an aperture formed therein sized to journally receive a post segment formed at each terminal end of said roller, and said second biasing means comprising a coil spring coaxially surrounding said pin segment of said roller support member and acting against said head segment and said guide bar for normally urging said roller support members and said roller in said first direction.

10. A guide loop assembly anchored to a support pillar of a motor vehicle for guiding the seat belt webbing from a belt retractor, said guide loop assembly comprising:

a frame anchored to the support pillar;

a locking assembly supported on said frame for movement between an unlocked position and a locked position, said locking assembly comprising a clamp bar and a roller and first biasing means for maintaining said clamp bar and said roller in a spaced-apart relationship when said locking assembly is in said unlocked position; and second biasing means for normally biasing said locking assembly toward said unlocked position;

wherein the belt webbing is routed between said locking assembly and said frame such that under excessive vehicle deceleration conditions the belt webbing forcibly urges said locking assembly toward said locked position for frictionally clamping the belt webbing against said frame.

11. The guide loop assembly of claim 10 wherein said first biasing means comprises a spring having a first end connected to said clamp bar and a second end connected to said roller.

* * * * *